United States Patent
Cragun et al.

(10) Patent No.: US 7,962,514 B2
(45) Date of Patent: Jun. 14, 2011

(54) ATTACHING AND DISPLAYING ANNOTATIONS TO CHANGING DATA VIEWS

(75) Inventors: Brian J. Cragun, Rochester, MN (US); Douglas R. Fish, Rochester, MN (US); William C. Rapp, Rochester, MN (US); Cale T. Rath, Byron, MN (US); Hoa T. Tran, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 11/835,728

(22) Filed: Aug. 8, 2007

(65) Prior Publication Data
US 2008/0034283 A1    Feb. 7, 2008

Related U.S. Application Data

(63) Continuation of application No. 10/691,287, filed on Oct. 22, 2003, now Pat. No. 7,870,152.

(51) Int. Cl.
G06F 7/00 (2006.01)
G06F 17/30 (2006.01)

(52) U.S. Cl. ........................................ 707/781
(58) Field of Classification Search .................. 707/781
See application file for complete search history.

(56) References Cited

U.S. PATENT DOCUMENTS

| | | | |
|---|---|---|---|
| 5,253,362 A | 10/1993 | Nolan et al. |
| 5,309,359 A | 5/1994 | Katz et al. |
| 5,404,295 A | 4/1995 | Katz et al. |
| 5,537,526 A | 7/1996 | Anderson et al. |
| 5,548,739 A | 8/1996 | Yung |
| 5,600,775 A | 2/1997 | King et al. |
| 5,761,429 A | 6/1998 | Thompson |
| 5,832,474 A | 11/1998 | Lopresti et al. |
| 5,930,746 A | 7/1999 | Ting |
| 5,999,182 A | 12/1999 | Etchemendy et al. |
| 6,249,784 B1 | 6/2001 | Macke et al. |
| 6,279,014 B1 | 8/2001 | Schilit et al. |
| 6,311,189 B1 | 10/2001 | deVries et al. |
| 6,332,144 B1 | 12/2001 | deVries et al. |
| 6,484,156 B1 | 11/2002 | Gupta et al. |
| 6,519,603 B1 | 2/2003 | Bays et al. |
| 6,549,922 B1 | 4/2003 | Srivastava et al. |
| 6,571,295 B1 | 5/2003 | Sidana |
| 6,665,681 B1 | 12/2003 | Vogel |
| 6,687,878 B1 | 2/2004 | Eintracht et al. |
| 6,803,927 B1 | 10/2004 | Sahoo |

(Continued)

OTHER PUBLICATIONS

Chiueh et al., "An Annotation System for VSLI Design", Proceedings of the Tenth Annual International Phoenix Conference on Computers and Communications, 1991, pp. 755-761, IEEE.*

(Continued)

*Primary Examiner* — Michael Hicks
(74) *Attorney, Agent, or Firm* — Patterson & Sheridan, LLP

(57) ABSTRACT

Methods, systems, and articles of manufacture that may be used to attach annotations to a particular view of data described by the annotation are provided. The annotation may be attached in a manner that allows the annotation to be viewed when subsequent views having at least some visible cells in common with the annotated view are displayed. An annotation created for a view of data may be stored with links to each cell visible in the view. When a predetermined set of cells visible in the annotated view are subsequently displayed in another view, the annotation may be retrieved via the cell links and an indication of the annotation may be provided.

7 Claims, 10 Drawing Sheets

U.S. PATENT DOCUMENTS

| | | |
|---|---|---|
| 6,871,318 B1 | 3/2005 | Wynblatt et al. |
| 6,901,428 B1 | 5/2005 | Frazier et al. |
| 6,956,593 B1 | 10/2005 | Gupta et al. |
| 6,996,558 B2 | 2/2006 | Dettinger et al. |
| 7,010,144 B1 | 3/2006 | Davis et al. |
| 7,013,307 B2 | 3/2006 | Bays et al. |
| 7,051,275 B2 | 5/2006 | Gupta et al. |
| 7,107,260 B2 | 9/2006 | Nakamura et al. |
| 7,143,074 B2 | 11/2006 | Higgins et al. |
| 7,152,072 B2 | 12/2006 | Dobrowski et al. |
| 7,162,691 B1 | 1/2007 | Chatterjee et al. |
| 7,243,301 B2 | 7/2007 | Bargeron et al. |
| 7,260,777 B2 | 8/2007 | Fitzsimons et al. |
| 2002/0099552 A1 | 7/2002 | Rubin et al. |
| 2003/0061028 A1 | 3/2003 | Dey et al. |
| 2003/0069881 A1 | 4/2003 | Huttunen |
| 2003/0074375 A1 | 4/2003 | Nakamura et al. |
| 2003/0196164 A1 | 10/2003 | Gupta et al. |
| 2004/0111668 A1 | 6/2004 | Cragun et al. |
| 2004/0138946 A1 | 7/2004 | Stolze |
| 2004/0150669 A1 | 8/2004 | Sabiers et al. |
| 2004/0163042 A1 | 8/2004 | Altman |
| 2004/0192343 A1 | 9/2004 | Toyama |
| 2004/0205514 A1 | 10/2004 | Sommerer et al. |
| 2004/0205545 A1 | 10/2004 | Bargeron et al. |
| 2004/0260714 A1 | 12/2004 | Chatterjee et al. |
| 2004/0267798 A1 | 12/2004 | Chatterjee et al. |
| 2005/0091253 A1 | 4/2005 | Cragun et al. |
| 2005/0203876 A1 | 9/2005 | Cragun et al. |

OTHER PUBLICATIONS

Chervenak et al., "A Metadata Catalog Service for Data Intensive Applications", GriPhyN technical report, 2002.*

Electrical Schematics Page, Apr. 25, 2002, http://www.jlab.org/accel/inj_group/elec1.htm.

Naser Barghouti and Stephen North, "Improvise—a process modeling interface with multimedia graph diagrams", ACM Multimedia '95,http://www.cs.uic.edu/~ifc/mmwsproc/north/north.html.

GSDB 1.0 Schema Manual, Chapter 1: Overview, pp. 1-1 to 1-18, Dec. 13, 1996, <<http://www.ncgr.org/research/sequence/schema.html>>, cited in parent U.S. Appl. No. 10/691,287.

Office Action History of pending U.S. Appl. 10/691,287, dates ranging from Mar. 22, 2006 to Sep. 3, 2010.

* cited by examiner

ATTACHING AND DISPLAYING ANNOTATIONS TO CHANGING DATA VIEWS

CROSS-REFERENCE TO RELATED APPLICATIONS

This application is a continuation of U.S. patent application Ser. No. 10/691,287 filed Oct. 22, 2003, now U.S. Pat. No. 7,870,152 which is related to commonly-owned co-pending U.S. patent application Ser. No. 10/600,014, entitled "Universal Annotation Management System," filed Jun. 20, 2003, and Ser. No. 10/600,382, entitled "Heterogeneous Multi-Level Extendable Indexing for General Purpose Annotation Systems," filed Jun. 20, 2003, and Ser. No. 10/600,390, entitled "Federated Annotation Browser," filed Jun. 20, 2003, which all are herein incorporated by reference.

BACKGROUND OF THE INVENTION

1. Field of the Invention

The present invention relates to the field of data entry and retrieval and, more particularly, to a method and system for annotating changing views of data.

2. Description of the Related Art

An annotation system is used to create, store, and retrieve descriptive information about objects. Virtually any identifiable type of object may be annotated, such as a matrix of data (e.g., a spreadsheet or database table), a text document or an image. Further, subportions of objects (sub-objects) may be annotated, such as a cell, row, or column in a database table or a section, paragraph, or word in a text document. Some annotation systems store annotations separately, without modifying the annotated data objects themselves. For example, annotations are often contained in annotation records stored in a separate annotation store, typically a database. The annotation records typically contain information about the annotations contained therein, such as the creation date and author of the annotation, and an identification of the annotated data object, typically in the form of an index.

An indexing scheme is typically used to map each annotation to the annotated data object or sub-object, based on the index. Therefore, the index must provide enough specificity to allow the indexing scheme to locate the annotated data object (or sub-object). Further, the indexing scheme must work both ways: given an index, the indexing scheme must be able to locate the annotated data object and, given an object, the indexing scheme must be able to calculate the index for use in classification, comparison, and searching (e.g., to search for annotations for a given data object).

Relational databases are typically viewed by creating and issuing queries designed to return desired data. The desired data may be distributed among several rows and columns of data that may span multiple tables in the database. Therefore, in order to retrieve the desired data, the queries generally contain sufficient information to join the multiple tables and filter the rows and columns to return the desired data in a concise format, commonly referred to as a view. In other words, if the query was properly constructed, the resulting view is a subset of the database containing the desired data.

Annotations may be made describing entire views or subportions of a view, such as a row displayed in a view (a view row). However, as described above, a row in a view may represent an amalgam of data from many tables and columns. Further, views change from query to query, depending on the query conditions and the columns specified in the results field. Therefore, a challenge is presented when deciding what data should be referenced by the annotation. In other words, a decision must be made regarding what referencing data should be stored with an annotation related to a specific view that would allow the annotation to be retrieved and displayed.

For example, a user may create an annotation for a row in a view of data with columns A, B, and C. Clearly, the annotation should be displayed if the exact same view row is displayed. Similarly, the annotation should probably not be displayed if a subsequent view has neither columns A, B, and C. However, when only a subset of rows visible in the annotated view is visible in the subsequent view, whether or not to display the annotation may not be so clear. For example, if a subsequent view has columns A, B, and D (and not C), it may not be desirable to display the annotation created for the view with columns A, B, and C. On the other hand, if a subsequent view entirely encompasses the original view, for example, containing columns A, B, C, and D, the annotation for the original view should probably be displayed.

Accordingly, there is a need for a method of attaching and displaying annotations to changing data views. Preferably, the method will allow some level of user control to determine how closely a displayed view must match an annotated view before a corresponding annotation is displayed.

SUMMARY OF THE INVENTION

The present invention generally is directed to a method, system, and article of manufacture for attaching annotations to changing data views.

One embodiment provides a method of creating and displaying an annotation associated with an annotated portion of a first view of data. The method generally includes providing an interface allowing selection of the annotated portion of the first view of data and creation of the annotation, wherein the annotated portion comprises at least two sub-objects visible in the first view of data, creating a record containing the annotation and a link to each sub-object in the annotated portion, presenting a second view of data, analyzing the second view of data to identify sub-objects visible in both the second view of data and the annotated portion of the first view of data, and providing an indication of the annotation, only if a predetermined set of sub-objects visible in the second view of data are visible in the referenced portion of the first view of data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
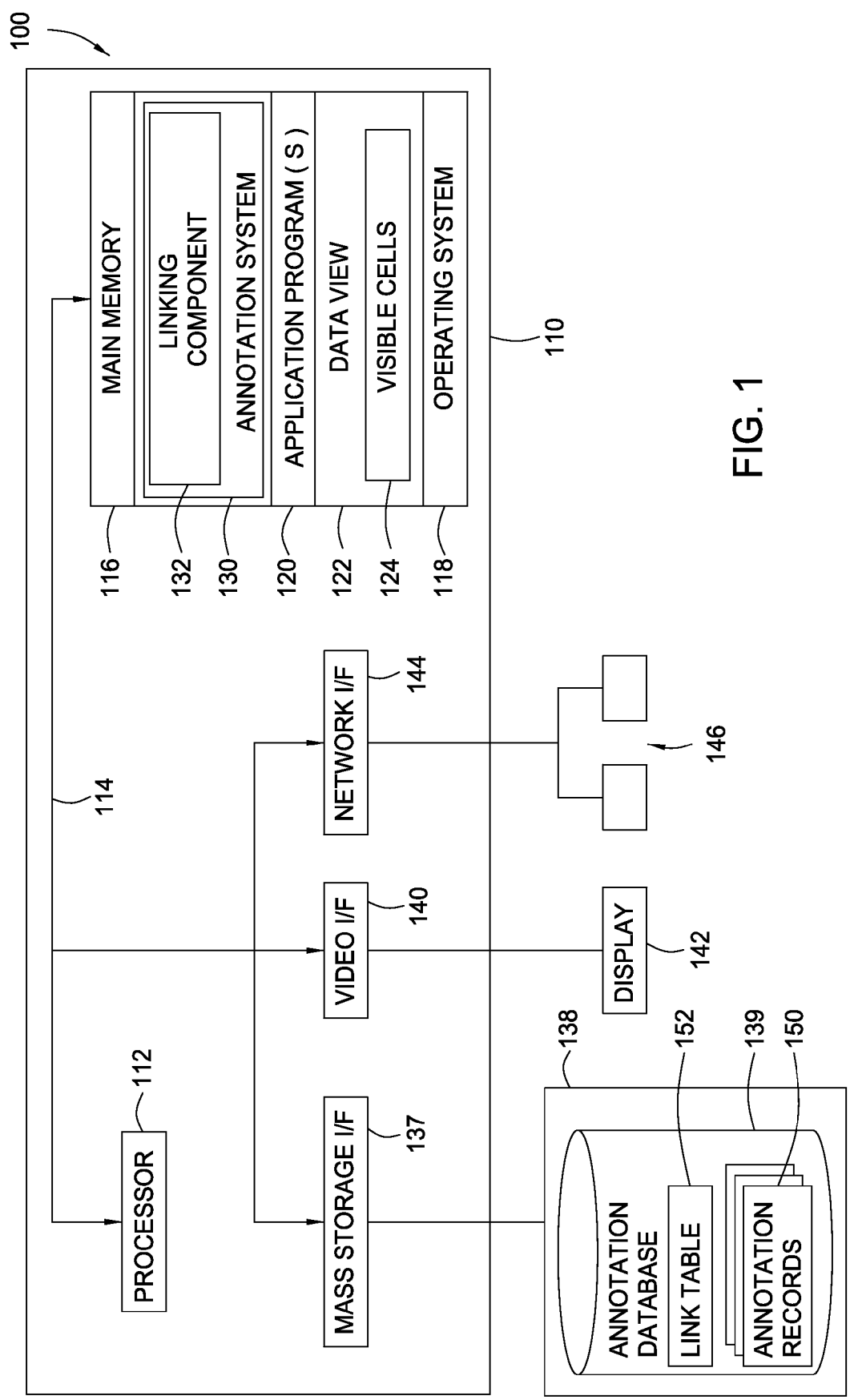
FIG. 1 is a computer system illustratively utilized in accordance with embodiments of the present invention.

The present invention provides methods, systems, and articles of manufacture that may be used to attach annotations to a particular view of data described by the annotation. The annotation may be attached in a manner that allows the annotation to be viewed when subsequent views having at least some visible sub-objects (e.g., cells of query results, words in a document, etc.) in common with the annotated view are displayed. For example, according to some embodiments, an annotation created for a view of data may be stored with links to each sub-object visible in the annotated portion of the view. When any sub-objects visible in the annotated view are subsequently displayed in another view, the annotation may be retrieved via the sub-object links. The subsequent view may then be analyzed to determine if an adequate number of sub-objects visible in the annotated view are visible in the subsequent view. If so, it is likely the annotation may also apply to the subsequent view and the annotation may, therefore, be displayed.

As used herein, the term annotation generally refers to any type of descriptive or identifying information associated with one or more data objects. Annotations may exist in various forms, including textual annotations (descriptions, revisions, clarifications, comments, instructions, etc.), graphical annotations (pictures, symbols, etc.), sound clips, etc. While an annotation may exist in any or all of these forms, to facilitate understanding, embodiments of the present invention may be described below with reference to textual annotations as a particular, but not limiting, example of an annotation. Accordingly, it should be understood that the following techniques described with reference to textual annotations may also be applied to other types of annotations, as well, and, more generally, to any type of data object that references another data object contained in a view of data displayed to a user.

Further, as used herein, the term view generally refers to any visible (or virtual) collection of data containing a set of visible sub-objects, regardless of the underlying data type (e.g., whether a database table, document, schematic, etc.). However, to facilitate understanding, the following description will refer to specific embodiments that relate to views of tabular data arranged in rows and columns defining visible cells. Further, while such embodiments are described with reference to views of query results generated in response to issuing a query, it should be understood that such views may also be generated according to any other technique, for example, using saved query results or any other type of data.

One embodiment of the invention is implemented as a program product for use with a computer system such as, for example, the computer system 110 of the data processing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Environment

Referring now to FIG. 1, the data processing environment 100 is shown. In general, the data processing environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer pSeries computer system available from International Business Machines (IBM) of Armonk, N.Y.

The computer system 110 could include a number of operators and peripheral systems as shown, for example, by a mass storage interface 137 operably connected to a direct access storage device (DASD) 138, by a video interface 140 operably connected to a display 142, and by a network interface 144 operably connected to the networked devices 146. The display 142 may be any video output device for outputting viewable information. The networked devices 146 may be any combination of any type networked devices, such as networked workstations, servers, printers, and network accessed storage (NAS) devices.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., DASD 138) or on another computer coupled to the computer system 110 via bus 114.

The memory 116 is shown configured with an operating system 118. The operating system 118 is the software used for managing the operation of the computer system 110. Examples of suitable operating systems include IBM's OS/400, IBM's AIX, Unix, Linux, Microsoft Windows®, and the like. The memory 116 further includes at least one application 120 and an annotation system 130. For some embodiments, the annotation system 130 may be integrated with the operating system 118 and/or may be capable of operating in a stand alone manner, for example, without an application 120.

The application 120 and the annotation system 130 are software products comprising a plurality of instructions that are resident at various times in various memory and storage devices in the computer system 110. When read and executed by one or more processors 112 in the computer system 110, the application 120 and the annotation system 130 cause the computer system 110 to perform the steps necessary to execute steps or elements embodying the various aspects of the invention. The application 120 is generally configured to access data in a database, for example, by issuing queries. Queries issued by the database may return sets of results displayed as views of data 122. In some cases, the database is a relational database and the results may be organized in rows and columns. Accordingly, a data view 122 may comprise one or more visible cells 124, each defined by a corresponding row and column pair.

The annotation system 130 is generally configured to allow users of the application program 120 to create, store, and retrieve annotations associated with various portions of a data view 122. The annotation system 130 may be any suitable type of annotation system and, for some embodiments, may be similar to the universal annotation system described in the commonly owned, co-pending application Ser. No. 10/600,014, entitled "Universal Annotation System," filed Jun. 20, 2003, herein incorporated by reference.

Annotations created via the annotation system 130 may be contained in annotation records 150, for example, stored in an annotation database 139 (e.g., in the DASD 138). The annotation records 150 may also contain various information about the annotation, such as the author and creation date of the annotation, as well as an index identifying the annotated view of data 122. For example, annotations may be created for individual cells, groups of cells, or columns of a data view 122. In any of these cases, the annotation may be stored in an annotation record 150, along with a reference to the annotated data. When an annotated cell, group of cells, or column is subsequently displayed (e.g., in a subsequent view), corresponding annotations may be retrieved based on the stored reference to the annotated data.

Annotations may also be created for an entire data view 122 or an entire row of data contained therein. As previously described, in these cases, it may not always be clear when to display the annotation to a user in subsequent views, particularly when only a subset of the annotated portion of a view is visible in the subsequent view. Therefore, for some embodiments of the present invention, the annotation system 130 may include a linking component 132 generally configured to create links to each cell visible in the annotated portion of the view. For some embodiments, the linking component 132 may also maintain a link table 152 that contains sufficient information to link visible cells of an annotated view or view row to corresponding annotations.

In other words, given a particular cell (e.g., identified by a column and row), sufficient information to retrieve one or more annotations associated with the cell may be returned from the link table 152. For example, the link table 152 may include an entry that includes one or more global unique identifiers (GUIDs), each corresponding to an annotation record 150 containing an annotation for a view or view row containing the cell. A corresponding annotation record 150 may include a set of cell links identifying other cells visible in the view or view row described by the annotation. As will be described in greater detail below, the annotation system 130 may use the cell links in an annotation record to identify annotations for views containing cells visible in a current view. Cell links stored in the annotation record may then be examined to determine how many cells of an originally annotated view or view row are visible in a subsequent view and, thus, whether to display a corresponding annotation.

Attaching Annotations to Views of Data

Figure 2A:
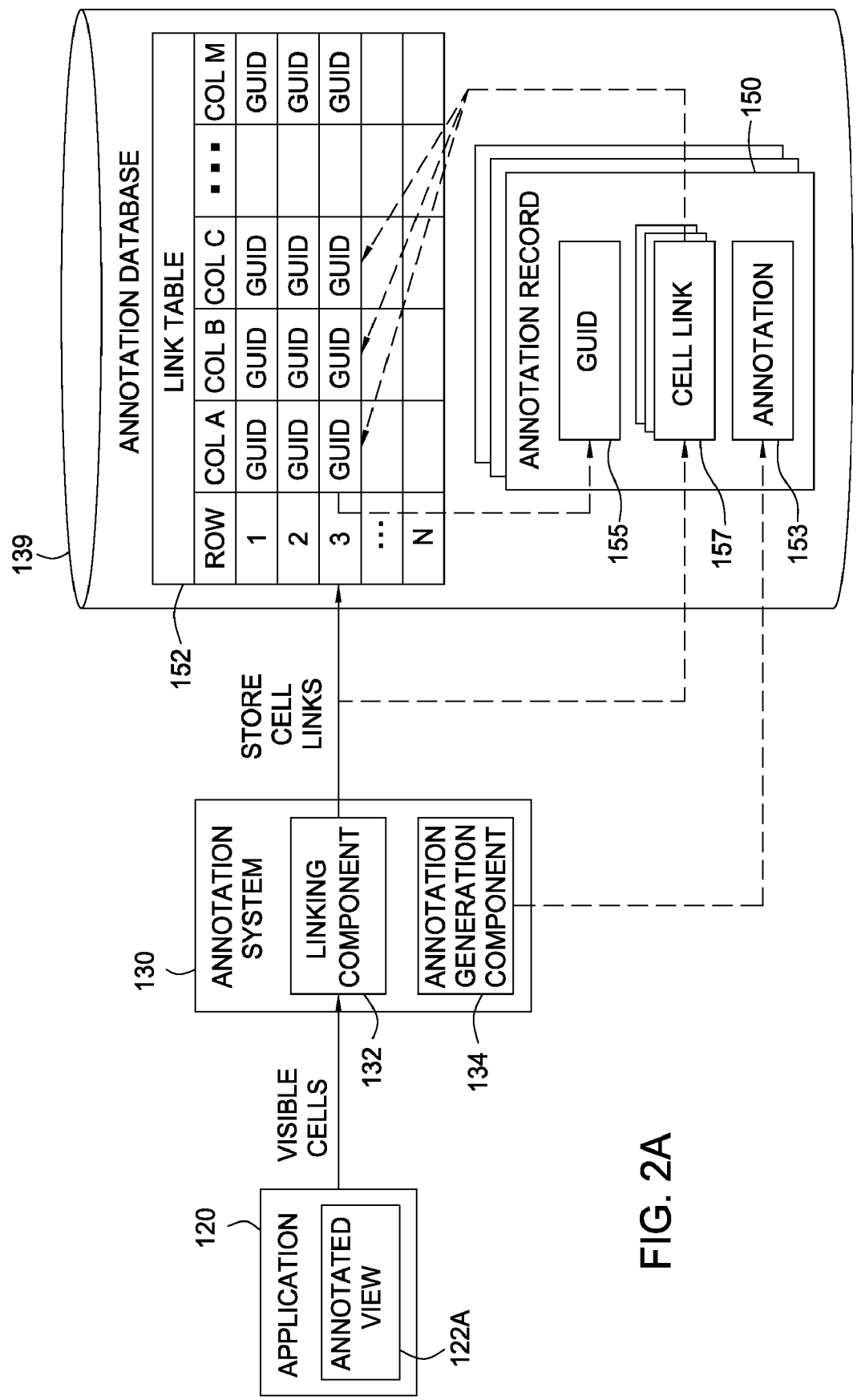
FIGS. 2A and 2B are relational views of exemplary components according to one embodiment of the present invention.
Figure 2B:
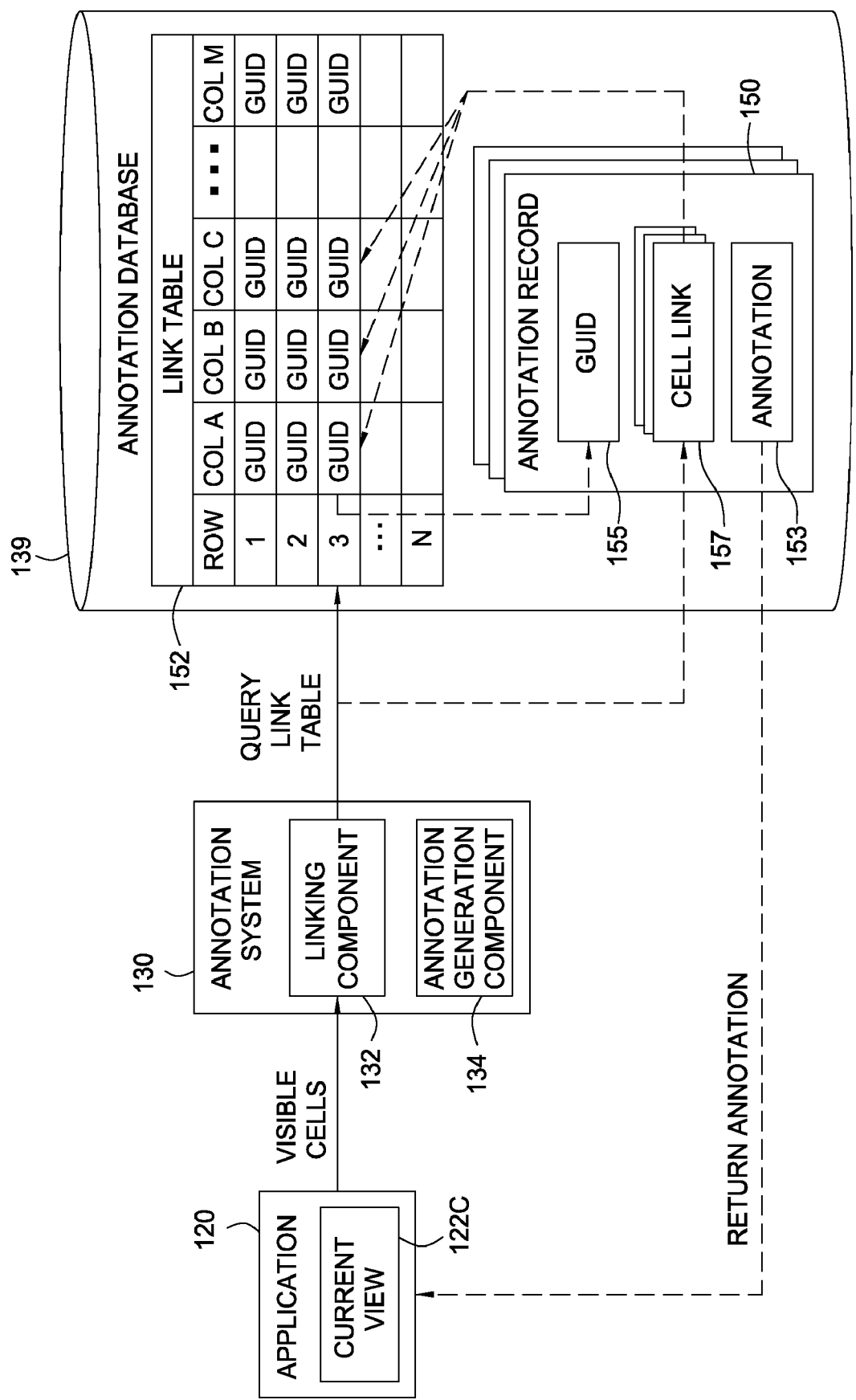

FIGS. 2A and 2B are relational views of various components of the annotation system 130 during generation and retrieval of an annotation associated with a portion of a view of data 122A, respectively, that illustrate the creation and utilization of cell links according to one embodiment of the present invention. As illustrated in FIG. 2A, the linking component 132 may receive, from the application program 120, a set of cells visible in the annotated portion of the view 122A (e.g. the entire view 122A or a row of cells contained therein). The linking component 132 may then create links 157 to the visible cells to be stored in a corresponding annotation record 150, as well as create entries in the link table 152 that may be used to identify the corresponding annotation record 150.

As illustrated in FIG. 2B, when a subsequent view of data 122C is displayed, the visible cells contained therein may be analyzed to determine whether to display a previously generated view annotation. For example, based on the cells visible in the view 122C, the linking component may query the link table 152 to identify an associated annotation record 150. Cell links in the associated annotation record 150 may then be examined to determine if a sufficient number of cells in the original annotated view 122A (or view row) are displayed in the current view. If so, an annotation 153 (or indication thereof) may be returned and displayed in the application 120.

Figure 3:
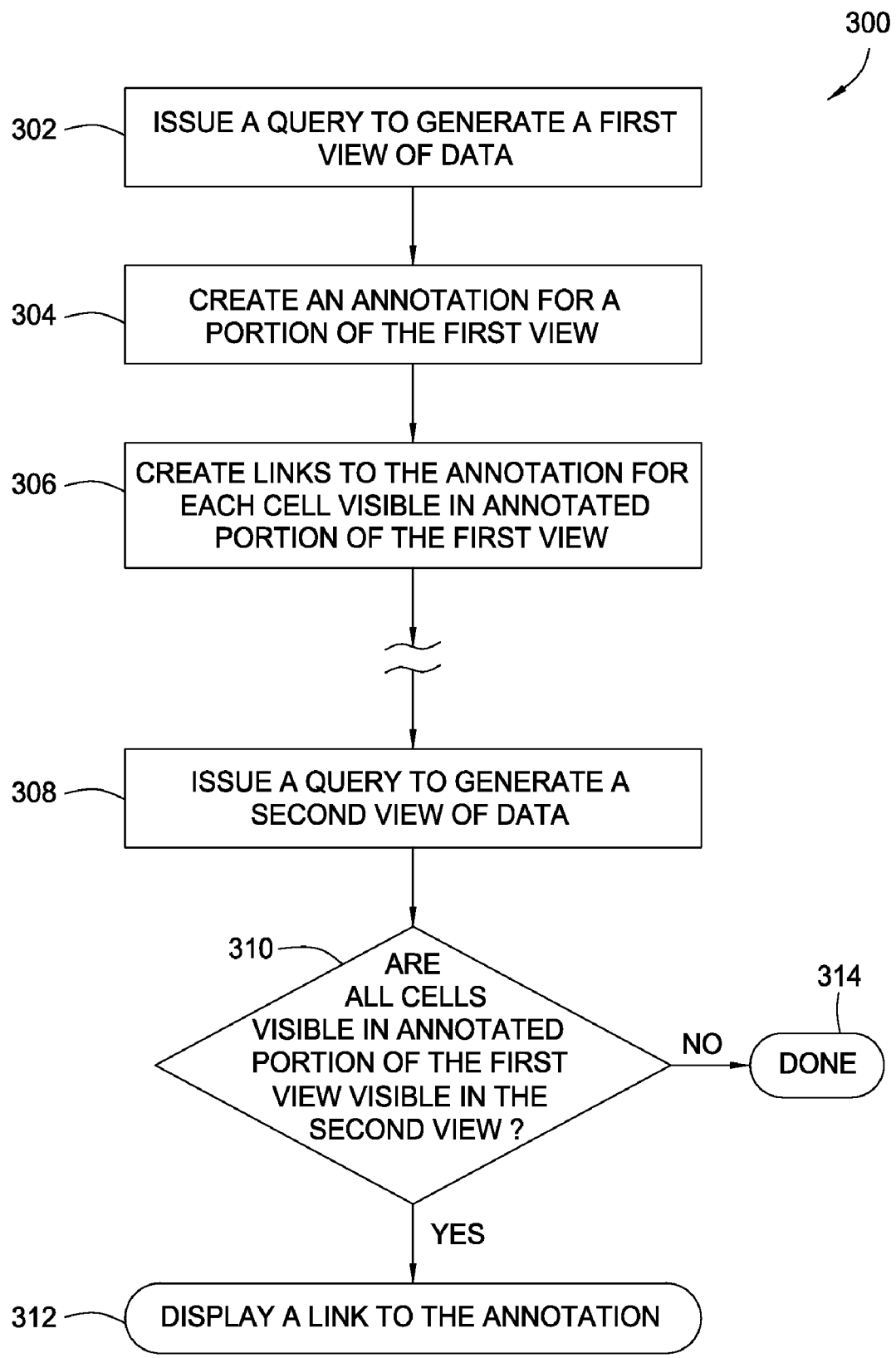
FIG. 3 is a flow diagram of exemplary operations for creating and displaying an annotation for a portion of a view of data according to one embodiment of the present invention.

Operation of the annotation system 130 and components therein may best be described with reference to FIG. 3, which illustrates exemplary operations 300 for attaching an annotation to a view of data or view row, according to one embodiment of the present invention. For some embodiments, some of the operations 300 may be performed in response to input received from a user via one or more graphical user interface (GUI) screens, such as the GUI screens 400-420 shown in FIGS. 4A-4F, which may be part of a comprehensive graphical query interface used to build and issue queries, view results, create and view annotations, and the like.

Figure 4A:
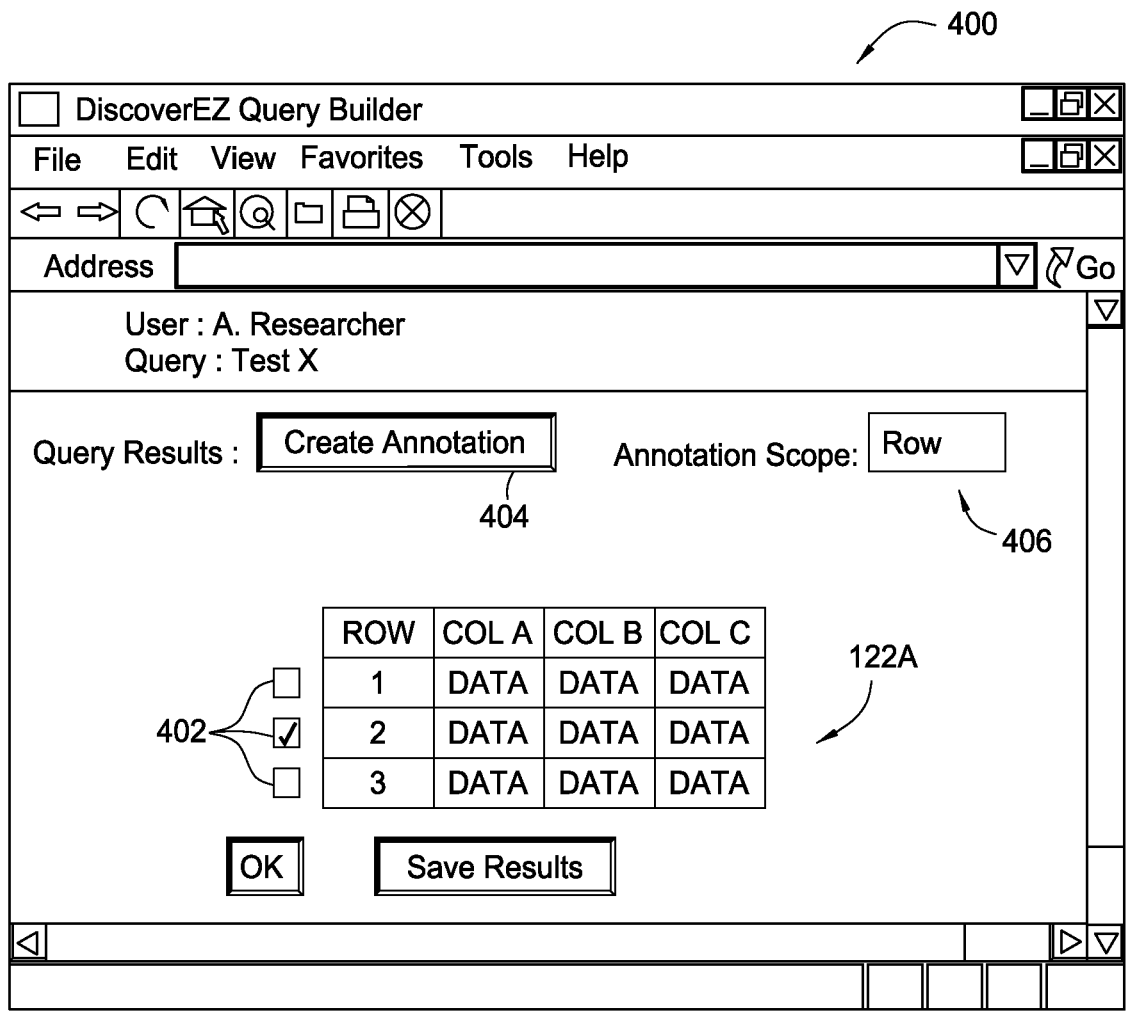
FIGS. 4A-4F are exemplary graphical user interface (GUI) screens according to one embodiment of the present invention.

The operations 300 begin, at step 302, by issuing a query to generate a first view of data, such as the view of data 122A shown in the GUI screen 400 of FIG. 4A. While the illustrated data view 122A shows only three columns and three rows, an actual view of data may literally contain hundreds or thousands of rows of data spanning several columns.

At step 304, an annotation is created for a portion of the first view of data (e.g., a view row or the entire view), for example, using the annotation generation component 134 shown in FIG. 2A. For some embodiments, the GUI screen 400 may allow annotations to be entered for different types of data objects visible in the view 122A via an annotation scope pull down menu 406. As illustrated, in response to selecting a Row annotation scope, checkboxes 402 may be displayed proximate each row in the view 122A. A user may then create an annotation for a view row by selecting an appropriate checkbox 402 and pressing a Create Annotation button 404, which may result in the GUI screen 410 of FIG. 4B (e.g., which may be considered part of the annotation generation component 134). As illustrated, the annotation may include an annotation creator 412 (e.g., the user creating or authoring the annotation), and a comment 414. As described in the previously referenced application Ser. No. 10/600,014, entitled "Universal Annotation Management System," the exact type of fields presented in an annotation interface may vary based on a number of factors.

A user may also be able to specify, via checkbox a 416, whether or not the annotation is to be displayed in partial views, for example, when only a portion of the cells visible in the annotated view or view row are visible in subsequent views. The user may also be able to specify for what types of partial views the annotation should be displayed. For example, the user may be able to specify a number, percentage, or a particular set of cells visible in the annotated portion of the original view that should be visible in a subsequent view before the annotation is displayed.

At step 306, links to the annotation for each of the cells visible in the annotated portion of the first view are created. As previously described with reference to FIG. 2A, cell links 157 may be contained in an annotation record 150 containing the annotation 153 describing the annotated view. While the cell links 157 will generally contain sufficient information to identify the corresponding cells visible in the annotate view or view row, the exact format of a cell link 157 may vary. For some embodiments, a cell link may simply contain an explicit reference to a row and column defining a cell, as well as a table containing the cell (recall the results may include data joined from multiple tables). For other embodiments, however, a cell link may include an index to a corresponding cell generated based on row, column, and table parameters. Such indexing techniques are described in the commonly assigned, co-pending application Ser. No. 10/600,382, entitled "Heterogeneous Multi-Level Extendable Indexing for General Purpose Annotation Systems," filed Jun. 20, 2003.

In any case, just as cell links 157 may indicate the cells visible in a view or view row described by an annotation, entries in a link table 152 corresponding to a given cell may indicate annotations describing views containing that cell. In other words, as previously described, given a cell, corresponding annotations for portions of previous views containing the cell may be found, for example, using GUIDs stored in a link table entry for the cell.

Retrieving Annotations Attached to Views of Data

After an annotation has been attached to a first view of data via operations 302-306, operations 308-312 may be performed to determine if the annotation should be displayed for a second (subsequent) view of data. At step 308, a query is issued to generate a second view of data. At step 310, a determination is made as to whether all cells visible in annotated portion of the first view of data are also visible in the second view of data.

The exact technique for determining whether all cells visible in the first view of data are also visible in the second view of data may depend on how the cells are referenced by the annotation. For example, referring to FIG. 2B, if a system contains a link table 152 linking cells to annotations, the annotation system 130 may query the link table 152 to retrieve a set of annotations (e.g., identified by associated GUIDs 155) for views or view rows containing cells visible in a currently displayed (e.g., the second) view of data 122C. Using a GUID 155 retrieved from a cell entry, the corresponding annotation record 150 may then be retrieved to obtain the set of cells visible in the annotated view, as indicated by the cell links 157 stored therein. The current view 122C may then be analyzed to determine if all of the cells visible in the annotated view or view row are also visible in the current view 122C. If so, the corresponding annotation 153 may be returned, for example, for display by the application 120. For some embodiments, a link table 152 may not be utilized and annotation records 150 may be searched directly to identify cells visible in corresponding annotated views, based on the cell links 157 stored therein.

Figure 4B:
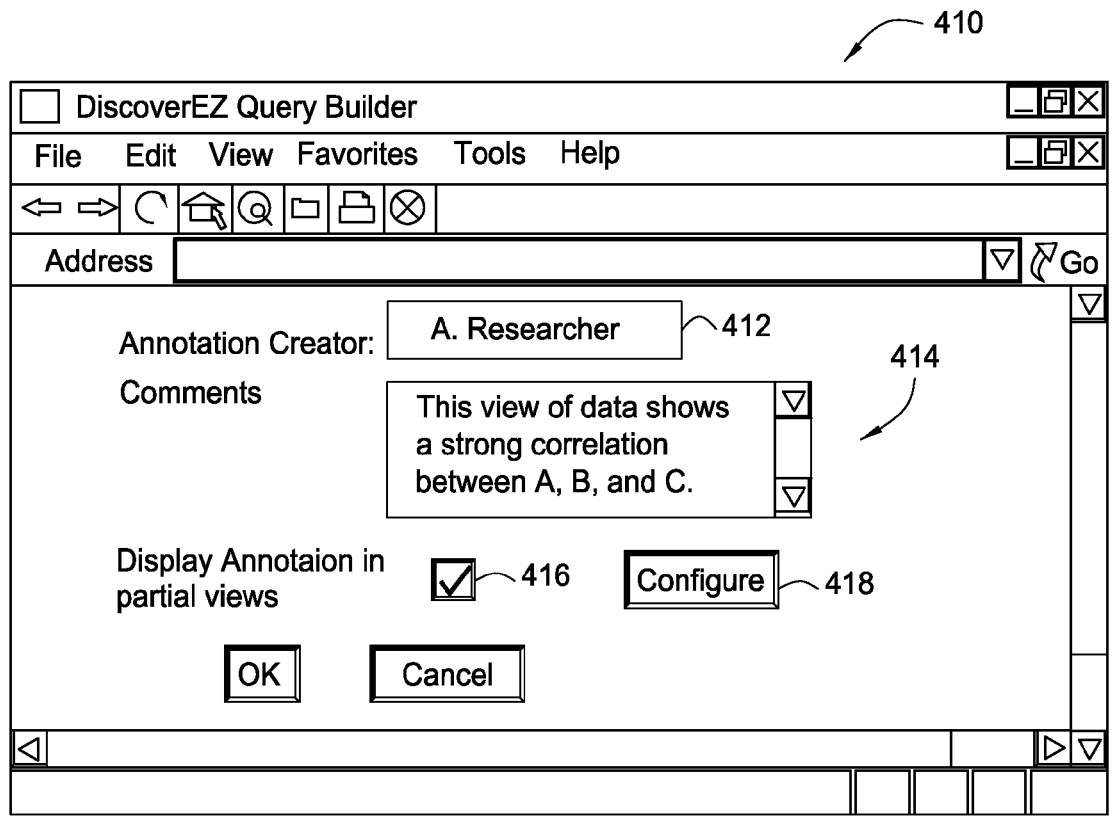
Figure 4E:
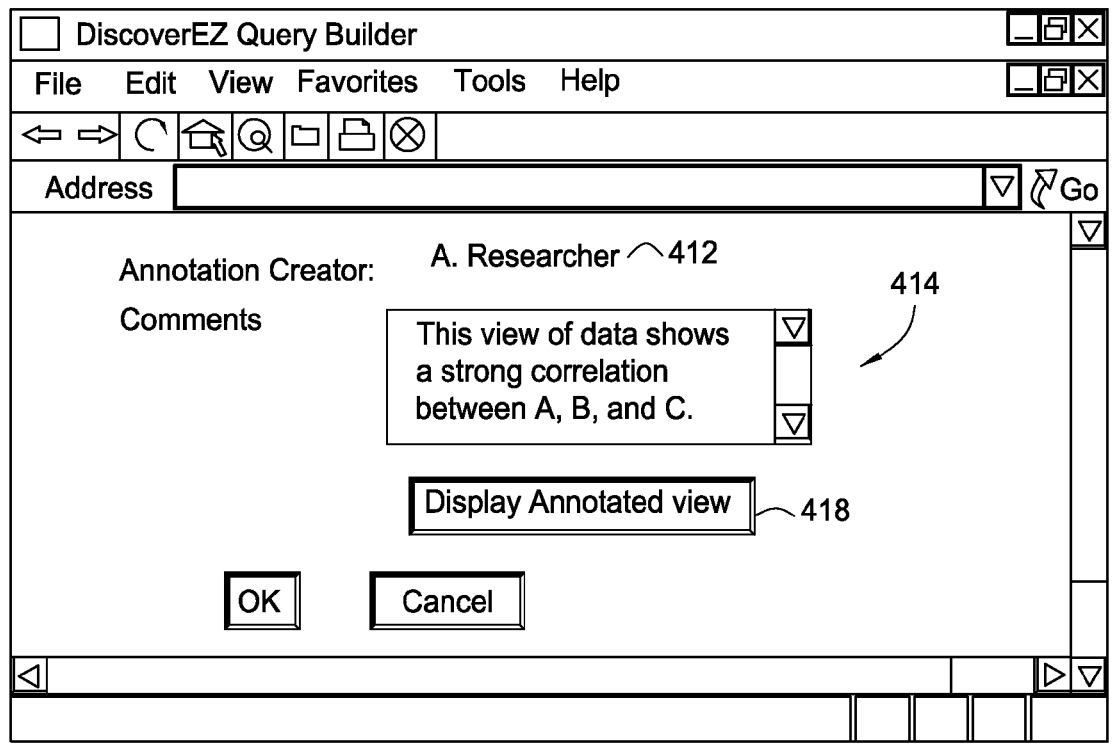
Figure 4C:
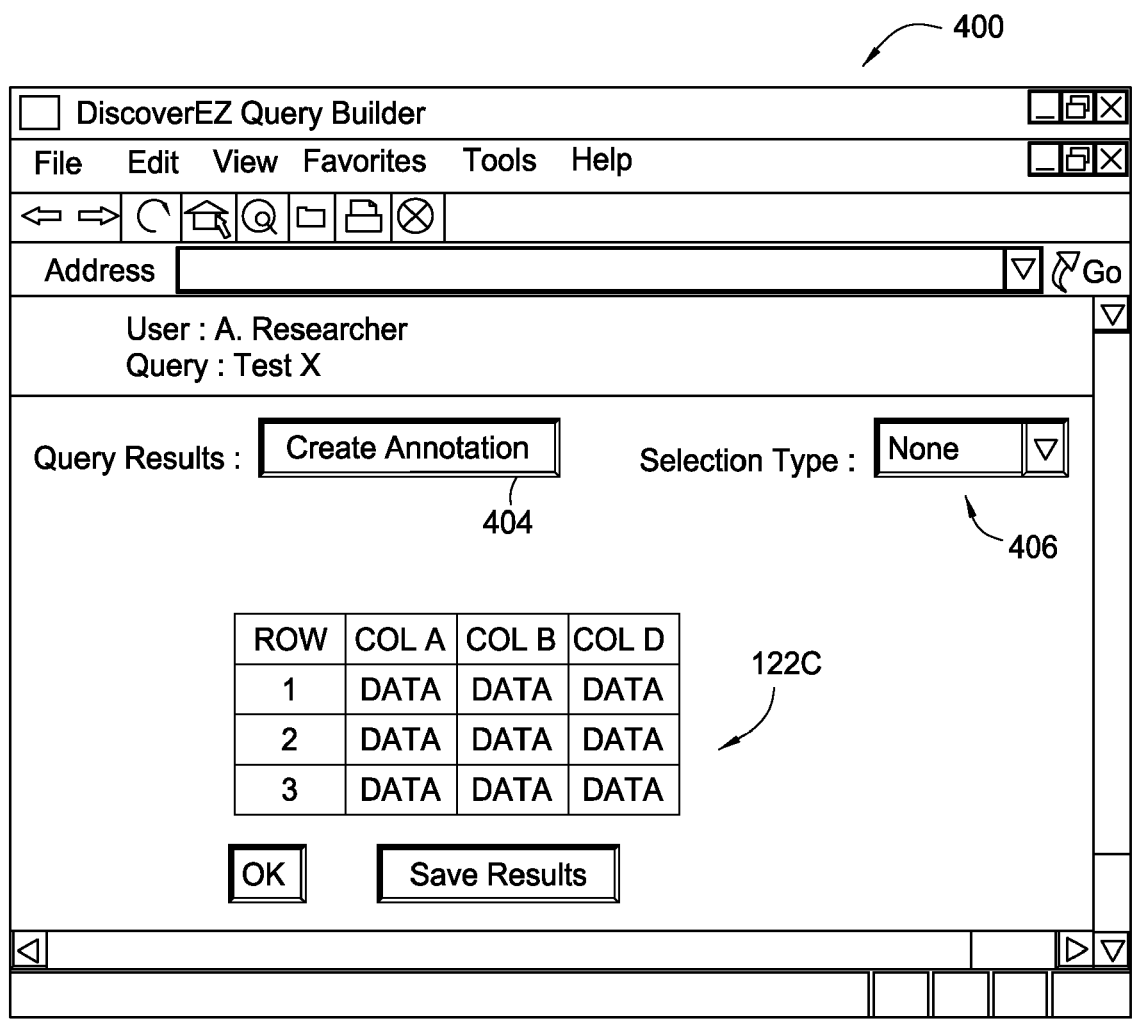

In any case, if all of the cells visible in the first view of data are not visible in the second view of data, the operations 300 terminate, at step 314. This situation is illustrated in FIG. 4C, in which the second view of data 122C contains rows 1-3 of columns A, B, and D. Recall that in FIGS. 4A-4B, an annotation was created for a row of the first view of data 122A having columns A, B, and C. Because the second view 122C does not contain column C (and therefore, does not contain the cell 2-C of the annotated view row), an indication of the annotation is not displayed.

Figure 4D:
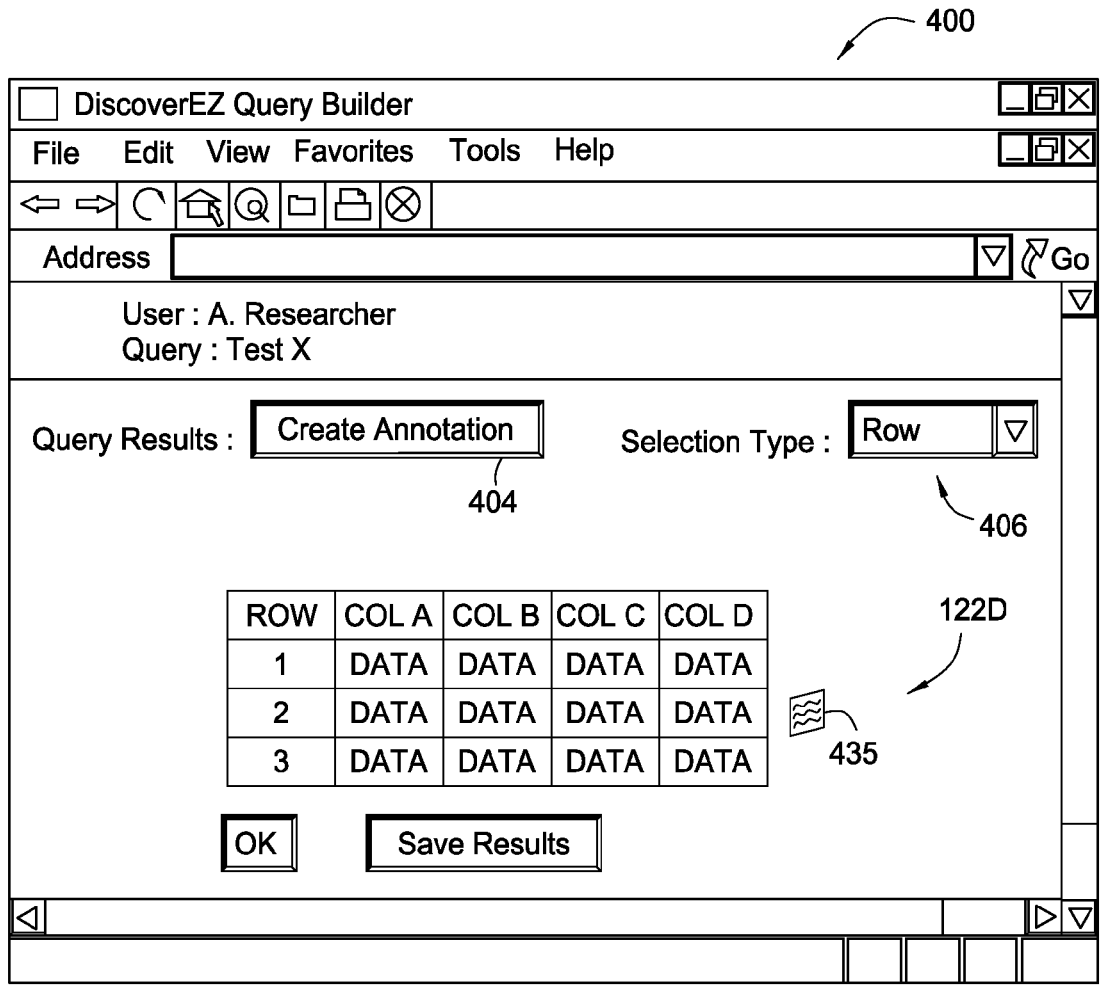

On the other hand, if all of the cells visible in the first view are also visible in the second view, a link to the annotation is provided, at step 312. This situation is illustrated in FIG. 4D, in which a second view of data 122D contains rows 1-3 of columns A, B, C, and D. In the illustrated example, the link to the annotation is provided as an annotation icon 435. For some embodiments, if multiple annotations exist describing views wholly (or partially) visible in the second view of data, multiple annotation icons (e.g., having different colors) or a single annotation icon indicating multiple annotations may be displayed. In response to a user selecting the annotation icon 435 (e.g., via a mouse click), the corresponding annotation may be displayed, for example, in the GUI screen 420 shown in FIG. 4E. In some cases, the annotation may have multiple versions and a GUI screen, similar to 420 may allow the user to view the different versions.

Figure 4F:
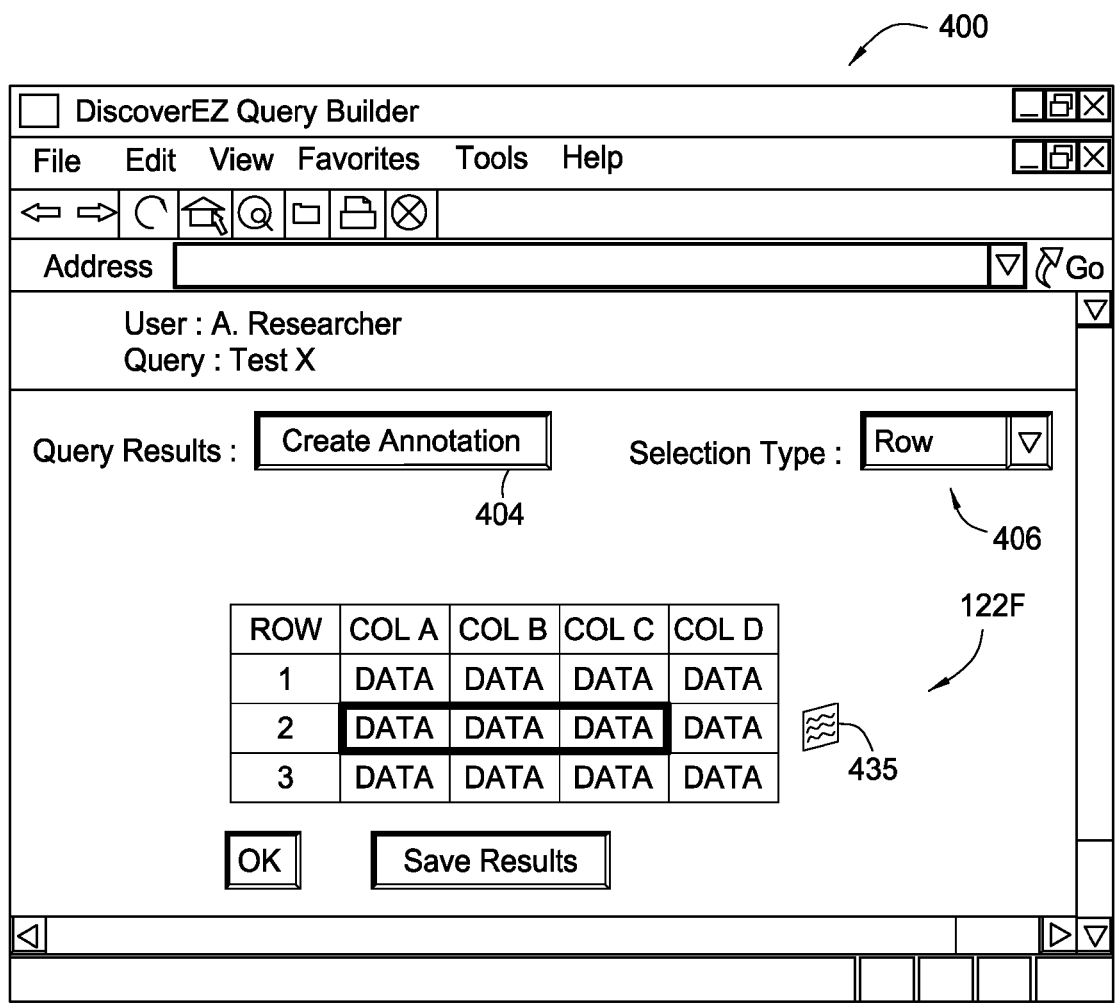

As illustrated, the user may also choose to display the annotated view, via a button 418. In response to selecting the button 418, the user may be provided with an indication of the annotated view, for example, in a separate GUI screen or by highlighting cells in the second view of data that were visible in the first view of data, as illustrated in FIG. 4F. For some embodiments, a similar indication of the annotated view may be provided automatically, for example, in response to a user placing a mouse cursor over the annotation icon 435. Further, for some embodiments, a portion of annotation information (e.g., author, creation date, etc.) may be displayed (e.g., as fly-over text) when the mouse cursor is placed over the annotation icon.

Displaying Annotations in Partial Views

As previously described with reference to FIG. 4B, a user may be able to specify whether an annotation should be displayed when only a portion of the cells visible in the annotated portion of a view are visible in a subsequent views. For some embodiments, the user may also be able to specify for what types of partial views the annotation should be displayed (e.g., via a configuration GUI screen accessed via the Configure button 418 shown in FIG. 2B), by specifying a number, percentage, or a particular set of cells visible in the original annotated view or view row that should be visible in a subsequent view before an indication of the annotation is displayed. In some cases, a user may even choose to only display an annotation when the exact view described by the annotation is displayed in a current view (e.g., with no additional cells visible in the current view). In any case, the annotation system 130 may be configured to determine whether or not to display an annotation by analyzing a current view in light of the user specified configuration.

Figure 5:
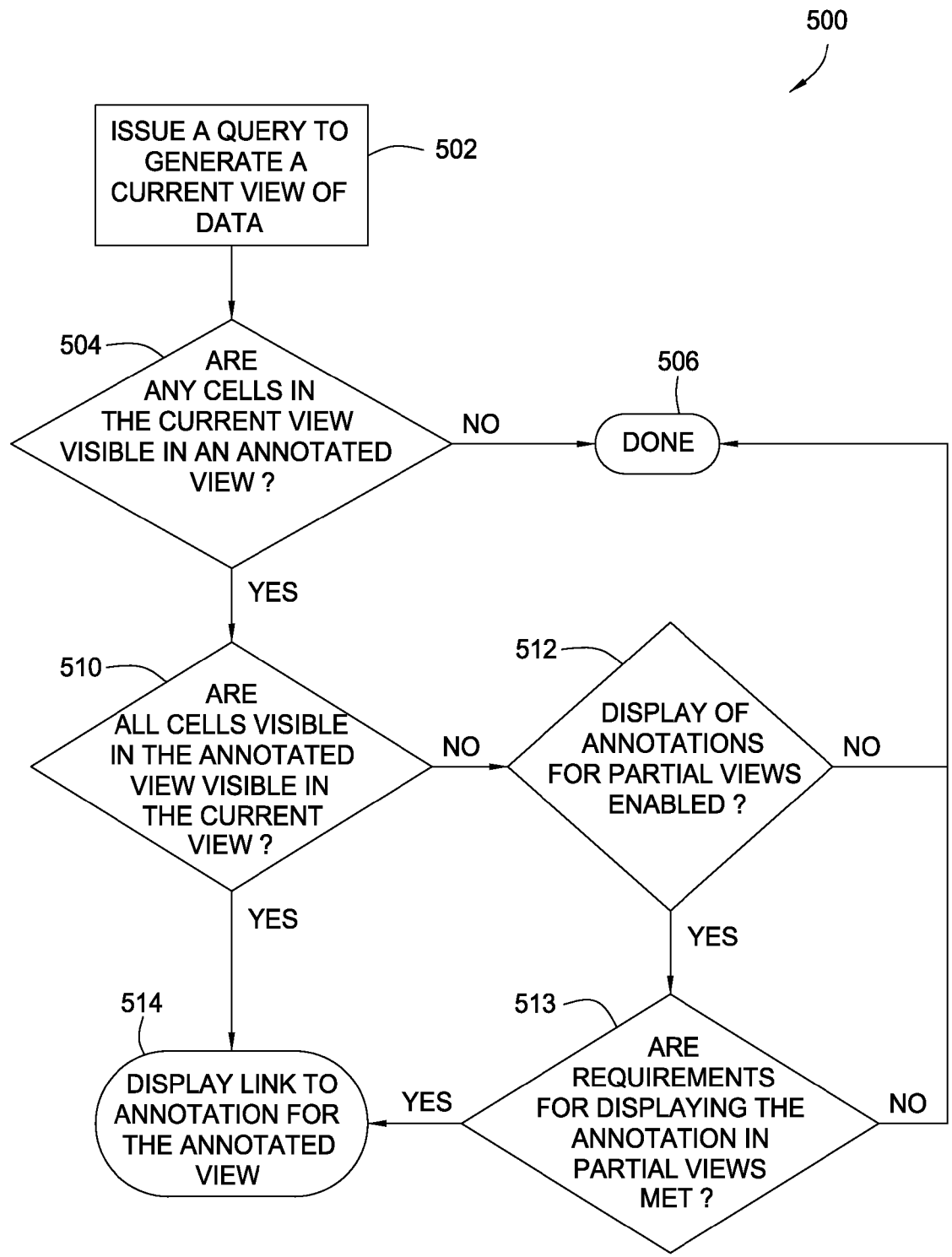
FIG. 5 is a flow diagram of exemplary operations for displaying an annotation attached to an annotated view of data according to one embodiment of the present invention.

FIG. 5 illustrates a flow diagram of operations 500 for displaying annotations in partial views. At step 502, a query is issued to generate a current view of data. At step 504, a determination is made as to whether any cells in the current view of data are visible in an annotated view, for example, by querying the link table 152 for entries corresponding to cells visible in the current view. If not, the operations terminate, at step 506. If so, a determination is made, at step 510, as to whether all cells visible in the annotated portion of a view are visible in the current view. If so, a link to the annotation for the annotated view is displayed, at step 514.

If all of the cells visible in the annotated view are not visible in the current view (e.g., the current view includes a partial view of the annotated view), a determination is made, at step 512, as to whether the display of annotations for partial views has been enabled. If not, the operations 500 terminate, at step 506. However, if display of annotations in partial views has been enabled, the current view is analyzed, at step 513, to determine if one or more requirements (e.g., specified by a user) for displaying the annotation in partial views has been satisfied. For example, the current view may be analyzed to determine if a particular set, certain percentage, or number of cells visible in the annotated portion of the original view are also visible in the current view. If so, a link to the annotation is displayed, at step 514. Otherwise, the operations 500 terminate, at step 506.

CONCLUSION

An annotation may be effectively attached to an annotated view of data it describes by creating links for each cell visible in the annotated view. The cell links may allow the annotation to be displayed even when displayed views of data change. By analyzing subsequent views of data to determine what, if any, cells visible in an annotated view are also visible in the subsequent views, intelligent decisions may be made regarding whether to display annotations in the subsequent views. In general, the more cells visible in an annotated view that are also visible in a subsequent view, the more likely it is appropriate to display the corresponding annotation in the subsequent view. However, by allowing a user to configure when an annotation should be displayed in subsequent views, the user may be able to tailor the display of annotations in subsequent views to their particular needs.

While the foregoing is directed to embodiments of the present invention, other and further embodiments of the invention may be devised without departing from the basic scope thereof, and the scope thereof is determined by the claims that follow. For example, as previously described the concepts described above with reference to cells of tabular data may also be applied to associate annotations with other types of views of data by creating links to sub-objects visible in annotated portions of the other types of views of data (e.g., words, paragraphs, and sections of a text document, or different graphical portions of an image).

What is claimed is:

1. A computer implemented method for providing an indication of an annotation to a portion of a first view of data, comprising:
   receiving an annotation to the portion of the first view of data, wherein a view of data comprises a collection of tabular data that contains visible sub-objects and that is returned from executing a query against a data source, and wherein the portion of the first view of data comprises a subset of the visible sub-objects, wherein the subset includes at least two of the visible sub-objects;
   receiving user input specifying one or more visible sub-objects of the annotated portion of the first view of data, for which the annotation is visible;
   providing an interface, wherein a second view of data is displayed via the interface;
   by operation of one or more computer processors, analyzing the second view of data to identify sub-objects visible in both the second view of data and the annotated portion of the first view of data; and
   providing an indication of the annotation in the interface, upon determining that the specified one or more sub-objects is visible in the second view of data, wherein providing an indication of the annotation in the interface comprises outputting for display an indicator proximate one or more sub-objects visible in the second view of data that are also visible in the annotated portion of the first view of data.

2. A computer implemented method of creating and displaying an annotation associated with an annotated portion of a first view of data, comprising:
   providing an interface, wherein the annotated portion of the first view of data is selected via the interface, wherein the annotation is created via the interface, wherein the annotated portion comprises at least two cells visible in the first view of data and wherein a view of data comprises a collection of tabular data that is returned from executing a query against a data source;
   receiving user input specifying one or more cells visible in the annotated portion of the first view of data, for which the annotation is visible;
   creating a record containing the annotation and a link to at least one cell in the annotated portion;
   creating an entry in a link table for the at least one cell in the annotated portion, wherein the entry for the at least one cell contains an indication of the record;
   presenting a second view of data;
   by operation of one or more computer processors, analyzing the second view of data and the link table to identify cells visible in both the second view of data and the annotated portion of the first view of data; and
   providing an indication of the annotation in the interface, upon determining that the specified one or more cells visible in the first view of data are visible in the second view of data, wherein providing an indication of the annotation in the interface comprises outputting for display an indicator proximate one or more cells visible in the second view of data that are also visible in the annotated portion of the first view of data.

3. The method of claim 2, wherein the specified one or more cells comprises at least one of:
   a user-specified number of cells visible in the annotated portion of the first view of data;
   and
   a user-specified percentage of cells visible in the annotated portion of the first view of data.

4. A computer-readable storage medium containing a program for associating an annotation with an annotated portion of a first view of data, which, when executed by a processor, performs operations comprising:
   providing an interface allowing a user to select the annotated portion and to create the annotation, wherein the annotated portion comprises at least two cells visible in the first view of data, and wherein a view of data comprises a collection of tabular data that is returned from executing a query against a data source;

receiving, via the interface, user input specifying one or more cells visible in the annotated portion of the first view of data, for which the annotation is visible;

creating a link to each cell in the annotated portion;

creating a record containing the annotation and the link to each cell in the annotated portion;

presenting a second view of data;

analyzing the second view of data and the record to identify cells visible in both the second view of data and the annotated portion of the first view of data; and providing an indication of the annotation in the interface, upon determining that the specified one or more cells visible in the first view of data are visible in the second view of data, wherein providing an indication of the annotation in the interface comprises outputting for display an indicator proximate one or more cells visible in the second view of data that are also visible in the annotated portion of the first view of data.

5. A system for creating and displaying annotations associated with views of data, comprising:

a processor;

an application for displaying views of data, wherein a view of data comprises a collection of tabular data that is returned from executing a query against a data source;

a storage medium for storing an annotation database for storing annotation records; and an annotation system configured to:

allow a user to create and annotation for a selected annotated portion of a first view of data displayed by the application, wherein the annotated portion comprises at least two cells visible in the first view of data;

allow the user to specify one or more cells visible in the annotated portion of the first view of data, for which the annotation is visible;

create cell links to each cell visible in the annotated portion;

create an annotation record containing the annotation and the cell links;

analyze the annotation record and a second view of data displayed by the application to identify cells visible in both the second view of data and the annotated portion of the first view of data; and provide an indication of the annotation, upon determining that the specified one or more cells visible in the first view of data are visible in the second view of data, wherein providing an indication of the annotation comprises outputting for display an indicator proximate one or more cells visible in the second view of data that are also visible in the annotated portion of the first view of data.

6. The system of claim 5, wherein:

the system further comprises a link table; and the annotation system is further configured to create an entry in a link table for each cell in the annotated portion of the first view of data, wherein the entry for each cell contains an identification of the annotation.

7. The system of claim 6, wherein the annotation system is configured to analyze the second view of data displayed by the application to identify cells visible in both the second view of data and the annotated portion of the first view of data by:

querying the link table to identify the annotation;

retrieving the annotation record containing the annotation and the query links; and identify, based on cell links contained in the annotation record, cells visible in the second view of data also visible in annotated portion of the first view of data.

* * * * *